United States Patent [19]
Reilly

[11] Patent Number: 4,543,773
[45] Date of Patent: Oct. 1, 1985

[54] ANTI-BLOWOUT PLATE FOR MULTI-SPINDLE MOWER DECKS

[75] Inventor: Roger D. Reilly, Beaver Dam, Wis.

[73] Assignee: Deere & Company, Moline, Ill.

[21] Appl. No.: 608,589

[22] Filed: May 9, 1984

Related U.S. Application Data

[63] Continuation-in-part of Ser. No. 508,220, Jun. 27, 1983, abandoned.

[51] Int. Cl.⁴ ............................................ A01K 35/264
[52] U.S. Cl. ...................................... 56/13.6; 56/13.8; 56/320.2
[58] Field of Search ...................... 56/13.6, 13.7, 13.8, 56/6, 503, 320.2, DIG. 22

[56] References Cited

U.S. PATENT DOCUMENTS

| | | | |
|---|---|---|---|
| 2,659,191 | 11/1953 | Miller et al. | 56/503 |
| 2,953,888 | 9/1960 | Phillips, Jr. et al. | 56/503 |
| 3,157,014 | 11/1964 | Bottenberg | 56/6 |

FOREIGN PATENT DOCUMENTS 819990 9/1959 United Kingdom ................. 56/13.6

*Primary Examiner*—Jay N. Eskovitz

[57] ABSTRACT

A multi-spindle mower deck containing a plurality of mower blades rotatably supported in a deck housing. A plurality of blow-out plates strategically located and fixably mounted to the forward sidewall of the housing below the mower blades.

3 Claims, 2 Drawing Figures

ANTI-BLOWOUT PLATE FOR MULTI-SPINDLE MOWER DECKS

CROSS REFERENCE TO RELATED APPLICATION

This application is a continuation-in-part of U.S. application Ser. No. 508,220 filed on June 27 1983, (now abandon).

BACKGROUND OF THE INVENTION

This invention relates to mower decks and, more particularly, to multi-spindle mower decks.

A conventional multi-spindle mower deck, for example, a three spindle mower deck, includes a housing having an open or exposed underside rotatably containing three mower blades mounted in close proximity. A rear baffel is mounted within the housing, closely following the rear sweep path of the blades. It is an objective of a conventional multi-spindle mower to create a air flow pattern such that uncut grass is lifted, cut and propelled to a discharge chute attached to the mower deck for collection.

It has been observed that conventional mower decks are subject to a condition referred to as a "Blow-out", occasioned when a portion of the cut grass is blown out of the front deck area. Blow-out is postulated to be the result of turbulent flow in the forward deck region. In order to obtain the proper lift and directional characteristic for the cut grass to side discharge, it is customary for the forward or front wall of the mower deck to be in space apart relationship to the forward sweep path of the mower blades, which provides the opportunity for developed turbulent air flow. As a result of blow-out, it is often necessary to make a second pass with the mower deck to retrieve blown out grass.

It is known to use a continuous flange portion inwardly directed from a housing wall below the mower deck windrowing grass clippings as illustrated in U.S. Pat. No. 3,157,014 (Bottenberg) or for providing a mower deck riding surface as illustrated in U.S. Pat. No. 2,991,612 (Holmes). The representative flange portions provide a degree of blow-out protection, however, they also facilitate clogging within the mower deck housing when the mower deck is used in wet grassiest condition as is often encountered in commercial applications. Clogging is precipitated in the housing region where the blade is in closest proximity to a housing sidewall and above the flange portion. Clogging can obstruct blade rotation causing damage to the blade drive means, i.e., friction damage to belt driven mower decks.

SUMMARY OF THE INVENTION

It is an objective of the present invention to provide a means whereby blow-out is substantially reduced.

A multi-spindle mower deck includes a housing containing a plurality of mower blades rotatably mounted therein. A rear baffel is fixably mounted in the rear portion of the housing and is configured to closely follow the rear sweep path of the blades. Fixably mounted to the forward sidewall and extending inward of the housing below the horizontal of the mower blades is a plurality of blow-out plates. Each blow-out plate is strategically placed to prevent a substantial amount of grass blow-out during the mowing operation.

DESCRIPTION OF THE PREFERRED EMBODIMENT

Figure 1:
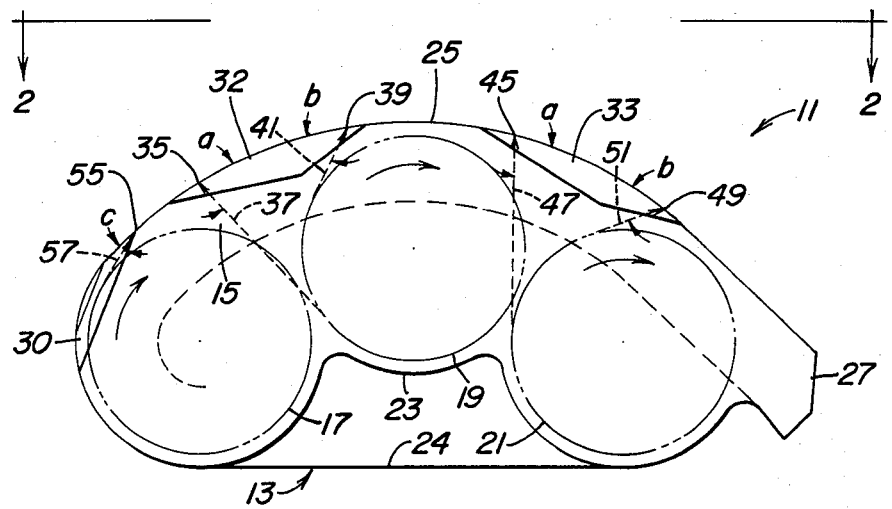
FIG. 1 is a schematic representation of the underside of a multi-spindle mower deck in accordance with the present invention.
Figure 2:
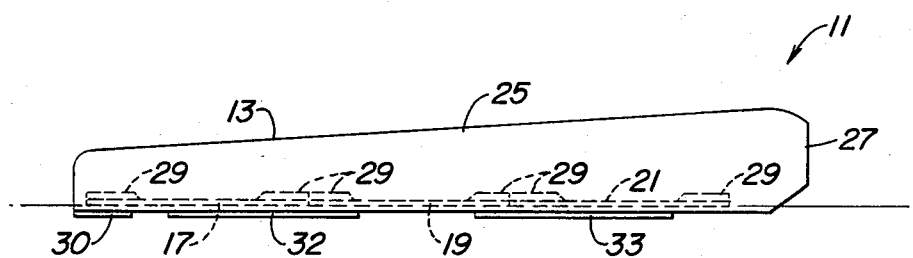
FIG. 2 is a frontal schematic view of the mower deck.

Referring to the figures, a three-spindle mower deck, generally indicated as 11, of generally conventional design is used for grass cutting and collection. The mower deck 11 is comprised in relevent part of a housing 13 with an open underside 15 rotatably containing by any conventional means a plurality of mower blades indicated here as 17, 19 and 21. A rear baffel 23 is fixably mounted by any conventional means within the housing 11 to the rear wall 24 of the housing 13 contoured to closely follow the rearward sweep path of blades 17, 19 and 21. The forward side wall 25 extends from the rear wall 24 in a smooth continuous and generally arched fashion to discharge opening 27. The function of the mower blades 17, 19 and 21 is to lift uncut grass by creating an updraft within the housing 11 which function is facilitated by the blade inclusion of end foils 29, and cutting the grass along the leading edge of the blade. The blade rotation also forms a vortex flow pattern which delivers the grass cutting at a high velocity to discharge opening 27 whereupon a conventional collection means is attached (not shown). Blade agitation also creates substantial turbulent flow within the housing 11 which causes substantial cut grass blow-out at strategic location along forward wall 25.

To substantially reduce blow-out and relieve the propensity for clogging when the mower deck is operated in wet grassiest conditions, a plurality of blow-out plates 32 and 33 are strategically located and fixably mounted by any conventional means to the front wall 25. The blow out plates 32 and 33 are respectively located between adjacent mower plate 17-19 and 19-21. Blowout plate 32 extends at least from a point at 35 located by the projection of a rotationally directed tangent line 37 to intersect the forward wall 25 at an angle "a" of approximmately 75 degrees to a point at 39 located by the projection of a rotationally directed tangent line 41 to intersect the forward wall 25 at an angle "b" of approximately 65 degrees. In like manner, blowout plate 33 extends at least from a point 45 located by the intersection of a tangent line 47 from blade 21 to the forward wall 25 at an angle "a" of approximately 75 degrees, to a point 49 located by the intersection of a tangent line 51 from blade 21 to the forward wall 25 at an angle "b" of approximately 65 degrees. The blowout plates 32 and 33 may extend beyond respective point 35-39 and 45-51 provided there is no overlap with blade 17, 19 and 21.

The blow-out plate 30 has been empirically shown not to be an undue participant of clogging in view of its constructive effect on material flow direction. The blow-out plate 30 extends from a location adjacent from the initial increased divergents of the blade 17 from wall 25 at 53 to a point 55 located by the projection of a rotationally directed tangent line 57 which intersects the forward wall 25 at an angle "c" of approximately 35 degrees. The blow-out plate 30 is permitted to extend below a portion of blade 17 to faciliate cost effective assembly.

It is postulated that the blow-out plates 30, 32 and 33 provide a tunneling effect on air flow within the housing 13 to result in a very suubstantial decrease in the blow-out of cut grass.

I claim:

1. In a multi-spindle mower deck having a housing with an open underside rotatably supporting a plurality of planularly aligned mower blades, said housing having a forward sidewall leading to a discharge opening, wherein the improvement comprises a plurality of blow-out plates fixably mounted to said forward sidewall, said blades defining a cutting circle, said blow-out plates extending from said forward sidewall longitudinally and inwardly relative to said housing below said plane of said blades so as not to overlap any portion of said cutting circle.

2. In a multi-spindle mower deck having a housing with an open underside rotatably supporting at least a first, second and third mower blade, said mower blades being planular aligned such that said second mower blade is located between and slightly forward of said first and third mower blades, said housing having a rear wall and a forward wall which extends from said rear wall in a continuous generally arched fashion to a discharge opening located laterally to said third mower blade, a baffle fixably mounted to said rear wall within said housing, wherein the improvement comprises a plurality of blow-out plates fixably mounted to said forward side wall respectively between adjacent ones of said mower blades, said mower blades defining a cutting circle with said blow-out plates extending from said forward sidewall below the plane of said mower blades longitudinally and inwardly relative to said housing such as not to overlap any portion of said cutting circle.

3. In a multi-spindle mower deck as claimed in claim 2 wherein said blow-out plates have a generally skewed triangular configuration with their respective basis extending along said forward wall, said blow-out plates being skewed toward said discharge opening.

* * * * *